US008887096B2

(12) United States Patent
Silbey et al.

(10) Patent No.: US 8,887,096 B2
(45) Date of Patent: Nov. 11, 2014

(54) FRIENDS LISTS WITH DYNAMIC ORDERING AND DYNAMIC AVATAR APPEARANCE

(75) Inventors: Marc Silbey, Mercer Island, WA (US); Kevin Yockey, Kelowna, CA (US)

(73) Assignee: Disney Enterprises, Inc., Burbank, CA (US)

( * ) Notice: Subject to any disclaimer, the term of this patent is extended or adjusted under 35 U.S.C. 154(b) by 563 days.

(21) Appl. No.: 13/283,464

(22) Filed: Oct. 27, 2011

(65) Prior Publication Data
US 2013/0111366 A1 May 2, 2013

(51) Int. Cl.
*H04L 12/58* (2006.01)
*G06F 15/16* (2006.01)
*G06F 3/01* (2006.01)
*G06F 3/048* (2013.01)
*A63F 13/30* (2014.01)
*G06Q 10/00* (2012.01)
*G06F 3/0482* (2013.01)
*G06Q 10/10* (2012.01)

(52) U.S. Cl.
CPC .............. *A63F 13/12* (2013.01); *G06Q 10/00* (2013.01); *H04L 51/04* (2013.01); *G06F 3/0482* (2013.01); *G06Q 10/10* (2013.01); *A63F 2300/556* (2013.01); *A63F 2300/5566* (2013.01)
USPC .............. 715/811; 715/757; 705/37; 709/204

(58) Field of Classification Search
CPC ...... G06F 3/0482; G06Q 10/00; G06Q 10/10; H04L 51/04
USPC ....................... 715/757, 811; 709/204; 705/37
See application file for complete search history.

(56) References Cited

U.S. PATENT DOCUMENTS

| 6,993,723 | B1 * | 1/2006 | Danielsen et al. | 715/751 |
|---|---|---|---|---|
| 7,072,941 | B2 * | 7/2006 | Griffin et al. | 709/204 |
| 7,111,044 | B2 * | 9/2006 | Lee | 709/204 |
| 7,171,448 | B1 * | 1/2007 | Danielsen et al. | 709/205 |
| 7,640,293 | B2 * | 12/2009 | Wilson et al. | 709/203 |
| 7,774,711 | B2 * | 8/2010 | Valeski | 715/752 |
| 7,828,661 | B1 * | 11/2010 | Fish et al. | 463/42 |
| 8,001,181 | B2 * | 8/2011 | Wilson et al. | 709/203 |
| 8,037,139 | B1 * | 10/2011 | Fish et al. | 709/206 |
| 8,112,720 | B2 * | 2/2012 | Curtis | 715/811 |
| 8,150,922 | B2 * | 4/2012 | Griffin et al. | 709/206 |
| 8,434,024 | B2 * | 4/2013 | Curtis | 715/811 |

(Continued)

OTHER PUBLICATIONS

Espinoza, et al., Geonotes: Social and navigational aspects of location-based information systems, 2001, Ubicomp 2001, Springer.*

*Primary Examiner* — Jordany Nunez
(74) *Attorney, Agent, or Firm* — Patterson & Sheridan LLP (57) ABSTRACT

Techniques are disclosed for presenting information related to a user's friends within a virtual environment. For example, when a user requests to view a friends list, the virtual environment may respond by identifying interactions between that user and their friends. From this, the virtual environment may determine an order to present the users in the list. For example, individual with whom the user interacts with frequently may be more prominently displayed. However, the user may fix or "pin" the position of certain users (e.g., a close friend with whom contact is infrequent). Further, in addition to displaying friends' names, the list may display an animation of a user's friend generated based on the then current activity, location, or appearance of that friend within a virtual environment.

16 Claims, 7 Drawing Sheets

(56) References Cited

U.S. PATENT DOCUMENTS

| | | | |
|---|---|---|---|
| 8,458,602 B2* | 6/2013 | Borst et al. | 715/757 |
| 8,555,178 B2* | 10/2013 | Blair | 715/752 |
| 8,635,273 B2* | 1/2014 | Appelman et al. | 709/204 |
| 2004/0015547 A1* | 1/2004 | Griffin et al. | 709/204 |
| 2004/0015548 A1* | 1/2004 | Lee | 709/204 |
| 2004/0015553 A1* | 1/2004 | Griffin et al. | 709/206 |
| 2004/0056901 A1* | 3/2004 | March et al. | 345/811 |
| 2004/0202117 A1* | 10/2004 | Wilson et al. | 370/310 |
| 2005/0076081 A1* | 4/2005 | Rui et al. | 709/204 |
| 2005/0198131 A1* | 9/2005 | Appelman et al. | 709/204 |
| 2006/0031366 A1* | 2/2006 | Dolph | 709/207 |
| 2006/0262967 A1* | 11/2006 | Hurst et al. | 382/128 |
| 2006/0282851 A1* | 12/2006 | Errico et al. | 725/39 |
| 2007/0250566 A1* | 10/2007 | Appelman et al. | 709/204 |
| 2008/0065758 A1* | 3/2008 | Narayanaswami | 709/224 |
| 2008/0183815 A1* | 7/2008 | Unger | 709/204 |
| 2008/0250332 A1* | 10/2008 | Farrell et al. | 715/753 |
| 2008/0270038 A1* | 10/2008 | Partovi et al. | 702/19 |
| 2009/0113314 A1* | 4/2009 | Dawson et al. | 715/757 |
| 2009/0164919 A1* | 6/2009 | Bates et al. | 715/757 |
| 2010/0162168 A1* | 6/2010 | Lee et al. | |
| 2010/0205546 A1* | 8/2010 | Appelman et al. | 715/758 |
| 2011/0055734 A1* | 3/2011 | Borst et al. | 715/757 |
| 2011/0126126 A1* | 5/2011 | Blair | 715/752 |
| 2011/0265018 A1* | 10/2011 | Borst et al. | 715/757 |
| 2012/0030734 A1* | 2/2012 | Wohlert | 726/4 |
| 2012/0072359 A1* | 3/2012 | Shaouy et al. | 705/319 |
| 2012/0084362 A1* | 4/2012 | McBrearty | 709/204 |
| 2012/0190386 A1* | 7/2012 | Anderson | 455/456.3 |
| 2012/0191796 A1* | 7/2012 | Griffin et al. | 709/206 |
| 2012/0278127 A1* | 11/2012 | Kirakosyan et al. | 705/7.29 |
| 2012/0290950 A1* | 11/2012 | Rapaport et al. | 715/753 |
| 2012/0311504 A1* | 12/2012 | Van Os et al. | 715/853 |
| 2013/0031475 A1* | 1/2013 | Maor et al. | 715/706 |
| 2013/0073556 A1* | 3/2013 | Valeski | 707/740 |
| 2013/0080529 A1* | 3/2013 | Appelman et al. | 709/204 |
| 2014/0096033 A1* | 4/2014 | Blair | 715/752 |
| 2014/0108546 A1* | 4/2014 | Appelman et al. | 709/204 |

\* cited by examiner

FRIENDS LISTS WITH DYNAMIC ORDERING AND DYNAMIC AVATAR APPEARANCE

BACKGROUND

1. Field

Embodiments presented in this disclosure generally relate to virtual environments. More specifically, embodiments pertain to techniques for dynamically ordering a user's friends lists and for displaying avatars depicting the friends' current actions in the friends list.

2. Description of the Related Art

Multiplayer video games and virtual worlds have rapidly become popular forms of online entertainment. Both generally provide users with access to a virtual environment where they may interact with one another. For example, the virtual environment might provide a virtual likeness of each user present within the virtual environment and users may interact with one another through their likenesses. Users control the actions of their likenesses to navigate the virtual environment, e.g., achieve gaming objectives as well as to communicate or chat with other users. Such an environment may be persistent where events occur and users interact with each other regardless of the presence of any particular user. Alternatively, such an environment may be game or session based, e.g., where a group of users participate in a match of a first-person shooter game Friends lists are often a prominent feature of these online environments. For example, a user may be allowed to "friend" another user in a virtual environment, thereby storing a relationship between the users. Such a relationship can then be portrayed in the user's friends list, which, much like an address book, displays information about friends of the user, including, for instance, the friends' user names, online or offline status, and locations within the virtual world. Most services order friends lists in virtual worlds alphabetically. Further, some services allow friends to be may be grouped into, for example, a "best friends" group. In some instances, the service may further include within the friends list avatars depicting graphic representations of each friend. In addition, some avatars may be allowed to be customizable such that the user or friend can not only select his or her own avatars, but also choose the avatar's colors, clothing, etc.

With an alphabetically ordered friends list, the user is often required to manually scroll through or search the list for particular friends. The burden of searching and scrolling is partially alleviated by grouping, but grouping requires the user to actively manage his or her friends list. Further, friends lists with avatars depicting representations of friends (including customized avatars) do not display friends' current appearances and actions in the virtual environment. Such depictions of friends' appearances and actions could convey useful information to other users that might be one basis for deciding, for example, whether to join the friend's activity.

SUMMARY

One embodiment of the invention provides a computer implemented method for displaying a dynamically-ordered friends list with dynamic avatars. This method may generally include receiving, from a first user interacting with other users in a virtual environment, a request to view a list of users associated with the first user, identifying one or more interactions that have occurred between the first user and one or more users in the list within the virtual environment, and determining, from the identified interactions, an order to present the users in the list to the first user. The interactions may be a variety of social interactions among the users of a virtual environment. Once determined, the method may further include presenting, by operation of one or more computer processors, the ordered list to the first user in response to the request.

Another embodiment includes a computer-implemented method for generating a list of users. This method may generally include retrieving, for a first user interacting with a virtual environment, a list of users associated with the first user and determining a set of then current information regarding at least one user in the list of users. This method may further include displaying a graphical representation of the users in the list of users. The graphical representation of the at least one user is determined, at least in part, on the determined information. For example, the then current information may correspond a current appearance of an avatar within the virtual environment corresponding to the at least one user. In such a case, the graphical representation could depict a then current appearance of the avatar. Similarly, the information could correspond to the then current activity of the user within the virtual environment and the graphical representation could depict the virtual world activity of that user. Another alternative includes depicting the graphical representation of the avatar so as to correspond to the real world location or activity of the user.

Other embodiments include, without limitation, a computer-readable medium that includes instructions that enable a processing unit to implement one or more aspects of the disclosed methods as well as a system configured to implement one or more aspects of the disclosed methods.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

When a user logs on to a given virtual world, the server hosting that environment creates an online presence for that user. Doing so allows the user to interact with others who have an online presence in the same location of that virtual world. The user may also have a collection of friends (relationships to other users in a variety of online environments) stored in a "friends" or contact" list. A monitoring component may track a variety of social interactions between the user and the user's friends. For example, the monitoring component may monitor chat messages exchanged between users, activities undertaken by the user and the user's friends, mutual interests shared by the user and the user's friends, among others. Based on monitored social interactions and/or activates of the user and the user's friends, the user's friends list can be dynamically ordered so as to place some users before others. For example, a friend who often interacts with the user and shares similar interests may be placed ahead of a friend who never interacts with the user and shares few common interests with the user.

In some embodiments, the ordering determined from the interactions and activities may be overridden by the user. That is, the user may be allowed to specify particular friends who will always appear at certain positions despite being ordered differently based on interactions and activities. "Pinning" users to certain positions is one example. Pinning may be useful for a user with some important friends that the user communicates with infrequently, resulting in those friends being moved down the list by the dynamic ordering process. The user can use pinning to override the automated dynamic reordering of selected friends and place the selected friends at predefined positions within the friends list (e.g., at the top of the friends list).

Additionally, the representation of an avatar may depict the current activity or location of that of the user within the online environment. Similarly, the reparation could be tailored based on the interests of that user. As another example, the representations could also be based on real-world activity, appearance, interests, or hobbies, etc., of the user corresponding to a given avatar.

Figure 1:
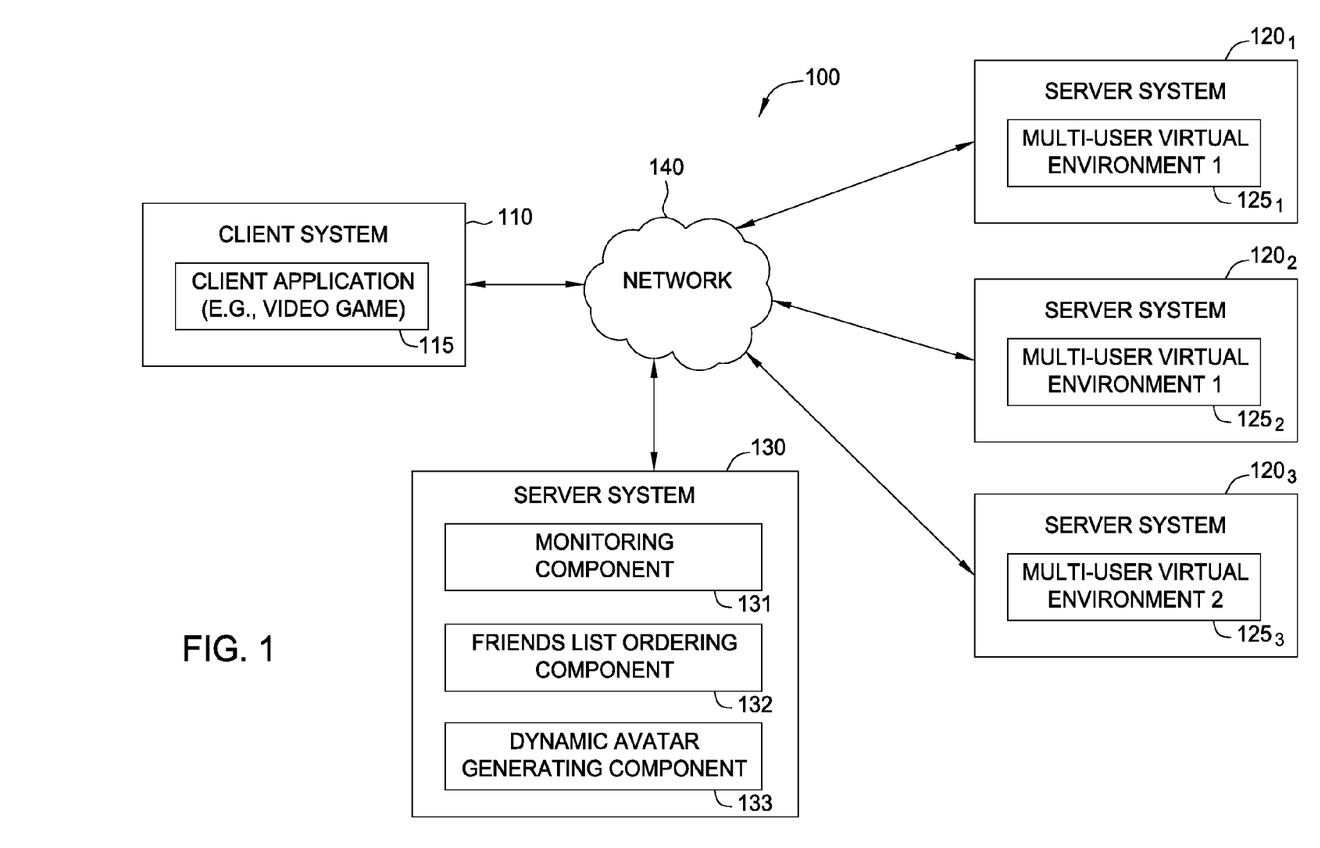
FIG. 1 is a block diagram illustrating a system configured to provide a virtual environment, according to one embodiment of the present invention.

FIG. 1 is a block diagram illustrating a system 100 configured to provide a virtual environment, according to one embodiment of the present invention. As shown, the system 100 includes a plurality of client systems 110 connected to a plurality of server systems $120_{1-3}$ and 130 via a network 140. Each of the client systems 110 is configured to operate a virtual environment client application 115. Examples of the client systems 110 include, without limitation, console gaming systems, handheld gaming systems, personal computer systems, tablet computers and mobile devices, etc.

The server systems $120_{1-3}$ are configured to operate multi-user virtual environments $125_{1-3}$. Generally, the server systems $120_{1-3}$ are configured to receive connections from users and to manage a virtual world and interactions between the users within the virtual world. Further, the servers $120_{1-3}$ can serve the same or different virtual worlds. As depicted, servers $120_{1-2}$ provide access to one world (though, different instances of that world), and server $120_3$ provides access to a different world. Each world may provide the same rooms, different rooms, or distinct instances of rooms $126_{1-9}$ for users to explore and experience. Although described with reference to separate server systems $120_{1-3}$, each hosting a distinct virtual world or instance of a virtual world $125_{1-3}$, embodiments of the invention may be adapted for systems in which a server hosts multiple instances of a virtual world or multiple virtual worlds.

Illustratively, the server system 130 includes a monitoring component 131, a friends list ordering component 132, and a dynamic avatar generating component 133. The monitoring component is generally configured to track the activity of users to derive information used to order friends in the friends list. For example, the monitoring component 131 may monitor whether a user is logged into a server, which server the user is on, who the user interacts with, and what the user does in one or more virtual worlds. In addition, the server system 130 may include a friends list ordering component 132 configured to order a friends list. The ordering of the friends list may be based, in part, on monitored information obtained by the monitoring component 131. Further, the server system 130 may include a dynamic avatar generating component 133. The dynamic avatar generating component may be configured to, based at least in part on the monitored information obtained by the monitoring component 131, generate for display avatars depicting the current appearance and location of users in one or more virtual environments. Further, the avatars may be animated to show the user's current actions or activities.

Although described with reference to a single server system 130 containing the foregoing distinct components 130-133, embodiments of the invention may be implemented where components 130-133 are split between servers rather than on the same server or where the components are combined in any of the possible permutations to perform functions the same as, or equivalent functions to, those described above.

Figure 2:
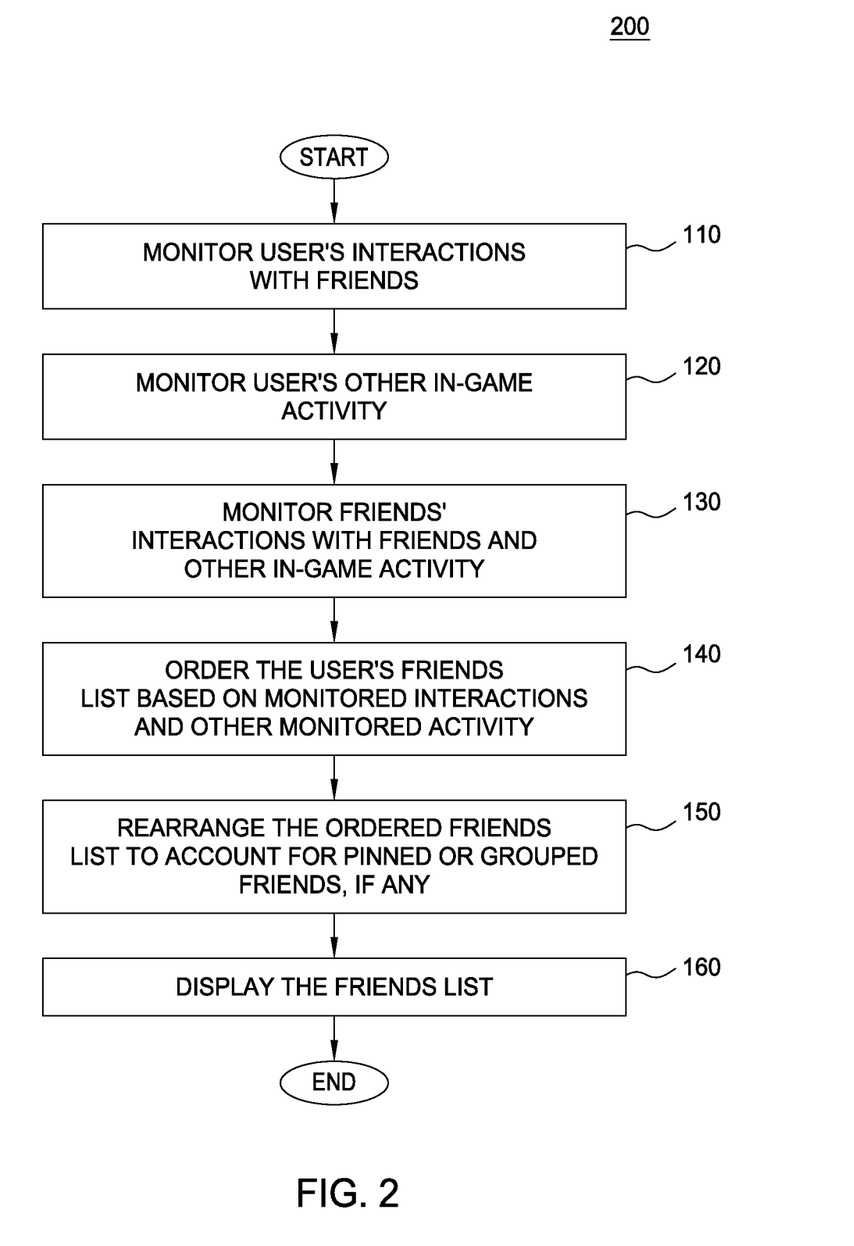
FIG. 2 illustrates a method for ordering a friends list according to the invention.

FIG. 2 illustrates a method 200 for ordering a friends list, according to one embodiment of the invention. As shown, the method 200 begins at step 210, where a user's interactions with friends in one or more worlds are monitored. For example, the monitoring component 131 may observe a user chatting, sending and receiving messages with other users, playing an online game; listening to music, watching videos, undertaking quests, or engaging in any other shared activity or experience in a given multi-user virtual environment.

At step 220, the monitoring component 231 may monitor other actions and activities of the user. For example, the monitoring component 231 may monitor quests the user undertakes, items the user buys and/or keeps, movies or TV shows the user watches, music the user listens to, other users and entities the user interacts with, locations in the virtual world the user visits, etc. At step 230, the interactions and activities of the user's friends in one or more worlds may be monitored. That is, in some cases, in addition to the monitoring the activity of the user directly, the actions of a user's friends may be monitored to derive information relevant to ordering the user's friends list. At step 240, the friends list ordering component 132 orders the user's friends based on the monitored interactions with the friend and other monitored activity. At step 250, the friends list ordering component 132 may reorder the friends list to account for pinned or grouped friends who do not appear in their pinned or grouped positions. Based on the pinning or grouping, the ordered friends list might be reordered to place the other user at or near a predefined position in the list (for example, at or near the top). At step 260, after determining an order (and after any reordering), the friends list is displayed in its final order to the user.

In one embodiment, data collected from monitoring the user and friends' activities is further processed before being used to determine the ordering of the friends list. This processing may include, e.g., determining the interests of the user or friend based on the activities (or known interests) of that user or friend. One person may be interested in watching TV, for instance, while another is interested in listening to music. In this example, the friends list ordering component 132 may order the user's friends list, at least in part, based on their respective interests.

In at least some embodiments, the method may include not only automatic ordering, but also automatic grouping of friends based on the monitored interactions and activities of the user and the user's friends. For instance, when more than a predefined number of friends congregate in one room, this activity may automatically cause the friends to be grouped together in the friends list. In one embodiment, such a grouping is automatically terminated when the predefined number of friends is no longer present in the room.

In some embodiments, the ordering at step 240 is based, at least in part, on a weighted sum of interactions between the user and the friend, where each interaction of a predefined type is weighted by a predefined amount and included in the weighted sum. The ordering could further account for the time when the interactions occurred, and, for instance, place greater weight on more recent interactions and vice versa. Similarly, the ordering depend on the how frequently two users interact with one another.

In some embodiments, the pinning and grouping features are enabled only after predefined conditions are satisfied. For example, defining and pinning a "best friend" when the user only has three friends may be unnecessary where the three friends always appear in the friends list and are easily identifiable. In contrast, where a user has many friends, some of whom are not always visible in the friends list, pinning makes more sense because the user can cause some friends (e.g., the user's best friends) be prominently displayed. Accordingly, in one embodiment, pinning a friend may be enabled after the user has acquired a predefined minimum number of friends. Other conditions may include that the user acquire a predefined item, complete a quest with the friend, acquire enough friends with a certain attribute, acquire enough friends with a common interest, etc.

In one embodiment, a user is notified about the new friends list feature when it is first made available to that user. This may include, for example, displaying a pop-up that points out the feature and explains how to use it. In at least some embodiments, features such as "best friend" pinning may be disabled when predefined conditions occur. For example, if the number of friends a user has decreases past a predefined number, the "best friend" feature may be deactivated. Further, other features regarding the friends list may be enabled (or disabled) based on the number of friends user has. Similarly, such features could be enabled (or disabled) when a user searches for friends using any relevant conditions (e.g., all friends in a given city). In such a case, if a user had many friends in the given city, then the ordering of search results could depend on the interactions with those friends (or dynamic information regarding heir then current on line or real world appearance, location or activities).

Note, although referred to herein as a "friends list," other types of lists, and graphical interface configurations, are broadly contemplated, including buddy lists, family lists, and contact lists. Likewise, the groups referenced herein are not to be limited to groupings of friends, but rather apply to groupings of other user relationships, user types, characters, and entities.

Figure 3:
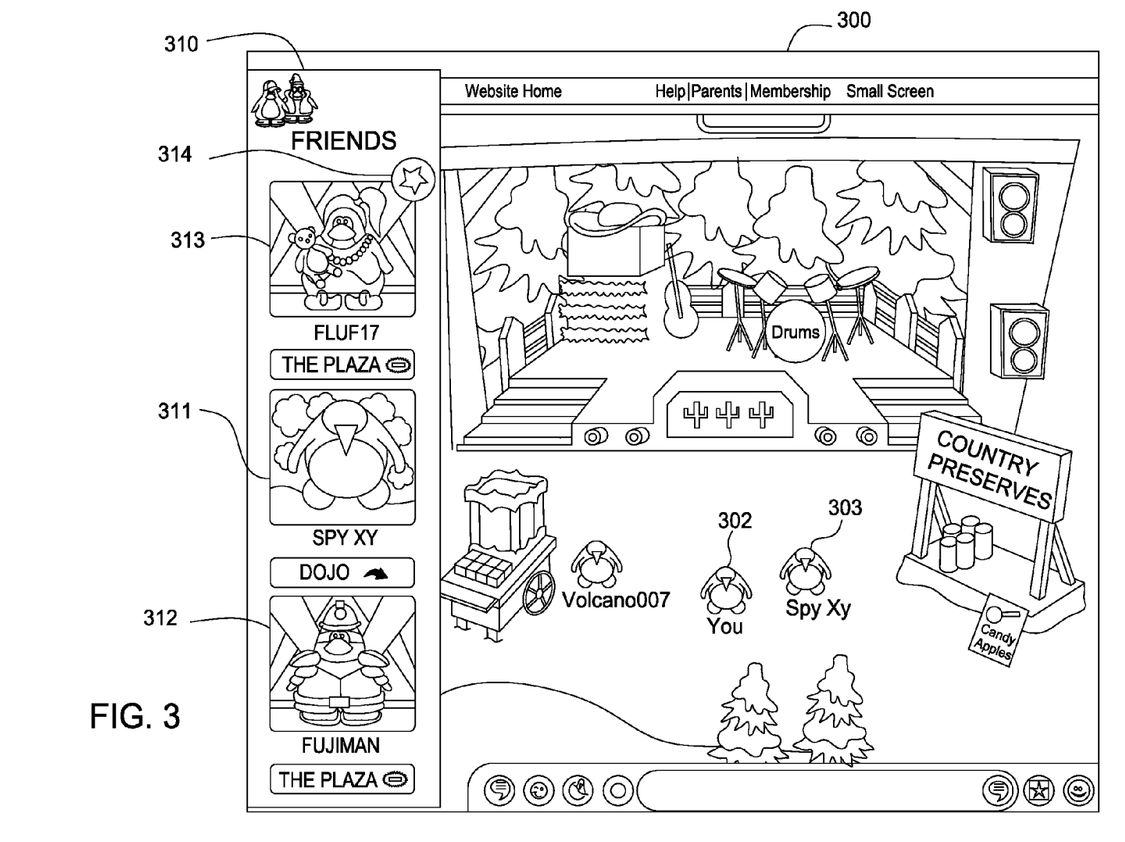
FIG. 3 depicts a virtual-world environment and a dynamically ordered friends list, according to one embodiment of the invention.

FIG. 3 depicts an example interface 300 presenting a virtual world environment and a friends list, according to one embodiment. As shown, the friends list 310 is displayed next to the virtual world environment 300, where users interact with one another. Illustratively, an icon 302 representing a user ("You") 302 and a friend ("Spy Xy") 303 are hanging out at the same place in the virtual world 300. As a result, a friends list 310 has been ordered to account for this interaction by placing the avatar and information related to "Spy Xy" 303 at position 311 ahead of other positions such as position 312. However, the icon representing "Spy Xy" 303 is not placed at the very top because the user has pinned another friend ("Fluf17") 313 there. The friends list 310 displays the pinning via a "best friend" icon 314.

In some embodiments, the friends list 310 may expand to accommodate more friends. Further, the friends list expands up to a size beyond which so many friends would be shown that the user would have difficulty easily identifying and selecting friends. In some embodiments, the interface 300 limits the number of friend icons presented to the user. The user may reveal additional friends using a scroll bar or search for friends using a search tool.

In addition to presenting avatars in a friends list, the avatars themselves may, convey information about the friend e.g., where the friend is engaging in some online activity. For example, an avatar may depict the current appearance of a virtual likeness of the user and present an animation of the current actions of the user's virtual likeness within the online environment. Thus, if a user is engaging in a game or some online activity with other users, the representation of the avatar may convey information about the game or online activity. Further, the background of the avatar may depict a graphical representation of the user current location within the online environment. Further still, the graphical representation could depict aspects of the users appearance or location.

Figure 4:
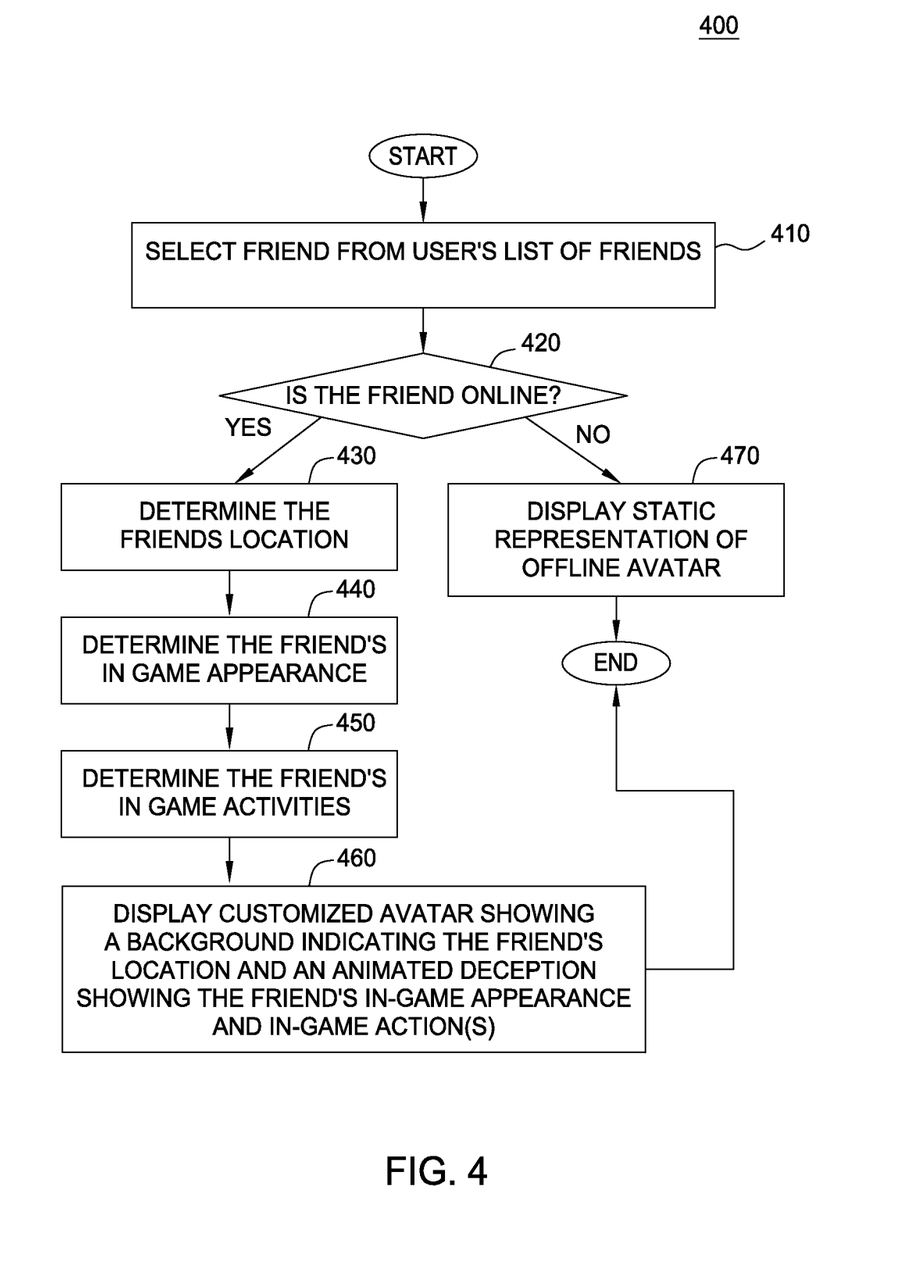
FIG. 4 is a flow diagram illustrating one embodiment of a method for generating a customized and dynamic avatar based on friends' virtual-environment locations, appearance, and actions.

FIG. 4 illustrates a method for generating a customized and dynamic avatar to present in a friends list, according to one embodiment of the invention. At step 410, the dynamic avatar generating component 133 selects a friend from the friends list. At step 420, the method asks the dynamic avatar generating component 133 determines whether the friend is online.

If the friend is offline, then at step 470, a static representation of an "offline" avatar may be shown. In contrast, where the friend is online, at step 430, the monitoring component 131 determines the location of the friend. For example, if distinct servers are running the same instance of the virtual world, and the virtual world itself includes distinct rooms for users to explore and experience, then the location may be defined in terms of a room in a server in a particular instance of the world. At step 440, the in-game appearance of the identified friend is determined. The appearance could include, for example, customized items worn by the friend, customized color schemes, and any animations associated with items worn by the friend or the virtual likeness of the friend. That is the customized appearance could be determined based on the then current actual appearance of the user's avatar within the virtual environment.

At step 450, the friend's current activities are determined. At step 460, an avatar associated with the friend is displayed to the user, with a visual rendering that conveys the identified activities or actions. Specifically, the avatar may depict a background indicating the friend's location and an animated depiction of the friend showing the friend's in-game appearance and actions. For example, a friend skiing at a virtual ski area may be shown wearing skiing gear and making skiing motions. Further, the animation itself (e.g., the skiing motions) could correspond to the actual skiing motions of the user within the virtual environment. More generally, the representation or animation of a friend in a user's friends list may be animated to have the same appearance and activity of that friend within a virtual environment.

Similarly, the appearance of an avatar could also depend on the real-world activity or location of the user. For example, the image of the second user could be a web-cam streaming a live feed of the friend. Doing so could present the activity of the user in the friends list. Similarly, a friend's real-world location could be used to render a depiction of that friend in the friends list.

Figure 5A:
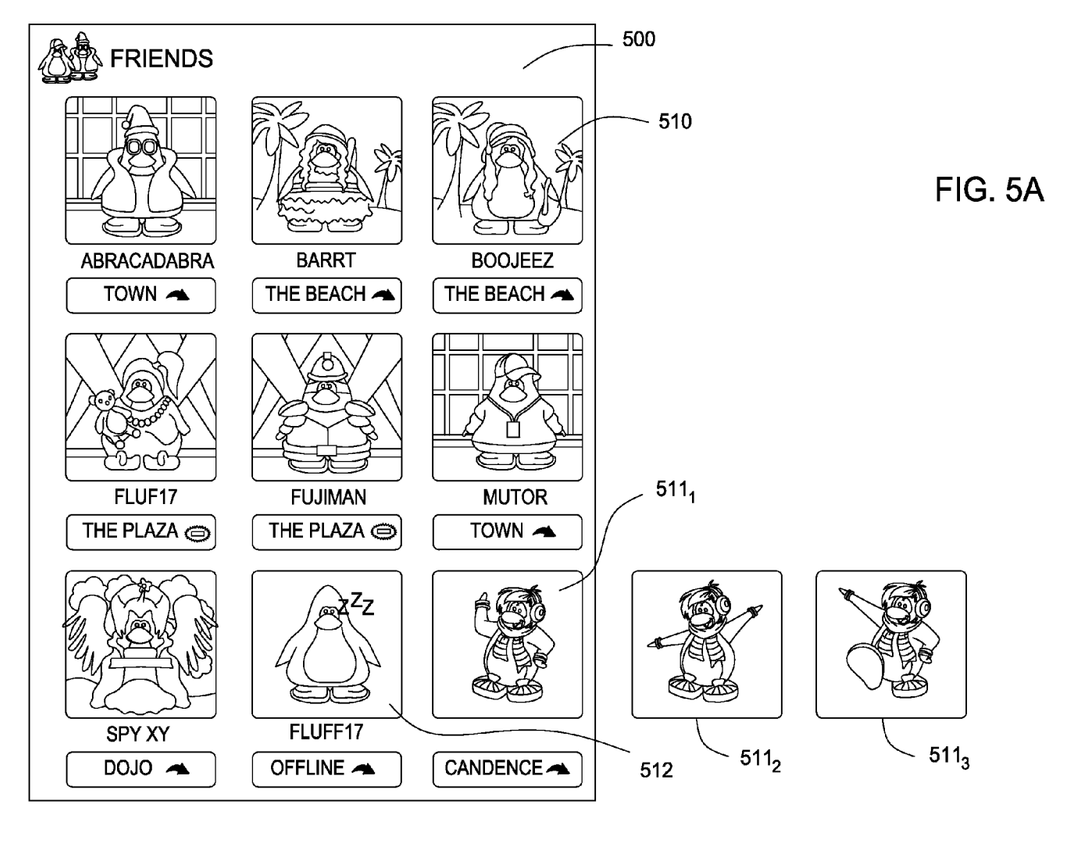
FIG. 5A depicts a friends list with dynamic and customized avatars according to one embodiment of the invention.

FIG. 5A shows an example friends list which includes an online friend and a depiction of the current activity and appearance of that friend within a virtual environment, according to one embodiment. As shown, friends list 500 includes an online friend displayed with a background indicating the location of that friend in the virtual world. The friends list 500 also indicates that a user is offline by displaying a gray "offline" text and a static sleeping avatar 512. The display area for offline friends may be minimized or otherwise reduced, thus providing room to display animation images $511_{1-3}$, which are displaying continuously such that a moving avatar appears to the user. Again, the animations in the friends list could be generated dynamically based on the actions of a friend within an online environment. That is, rather than display stored or generic animations, the activity in the friends list could show the actual activity of the friend within a virtual world. As another example, assume a friend is playing a multiplayer first-person shooter game in a virtual environment. In such a case, a friends list could depict that user as they run, jump, crouch, fire weapons, throw grenades, etc. Further, the background could show the then current location of the user within a first-person shooter map. Of course, "canned" animations could also be used to represent certain activities or backgrounds for some locations.

In some embodiments, avatars may further include custom images or music specified by the friend or user. These customizations can be in addition to, or to the exclusion of, the background depiction of the friend or user's location and the depiction of the in-game physical appearance of the friend or user.

As noted, both virtual and real world locations and activities may be depicted in a friends list. For example, at time A, a friend may be playing a mini-game in a room of the virtual world and the friend's avatar might depict the mini-game being played by the user in the foreground and the room in the background, as well as the user's appearance in the virtual world. At time B, when the friend decides to leave for a jog in the park, the avatar may change to depict that the friend is jogging in a park, as well as the user's appearance in the real world (e.g., wearing jogging attire). In particular, in some embodiments the system may automatically determine how to depict the real-world information. For example, if the user says "I'm in San Francisco," the system may decide to use a popular image of San Francisco in the background (e.g., a stored image of the Golden Gate Bridge). In an alternative embodiment, the user might also be allowed to upload an image to use in the background. Further, various embodiments may offer different options for users to input real-world information to the system. In one embodiment, the user manually enters his or her location (e.g., the system could ask for the user's location and activity, and the user could choose "San Francisco" on a map and "watching a movie"). In an alternative embodiment, the user could "check-in" to a place using any number of check-in apps, or a "Smartphone" the user owns could automatically send the user's location based on GPS coordinates. In yet another embodiment, the user might take a picture of where he or she is, and the system could automatically figure out, for example, that the user is by the beach. In further embodiments, the user could use any other means you of inputting real-world information.

Figure 5B:
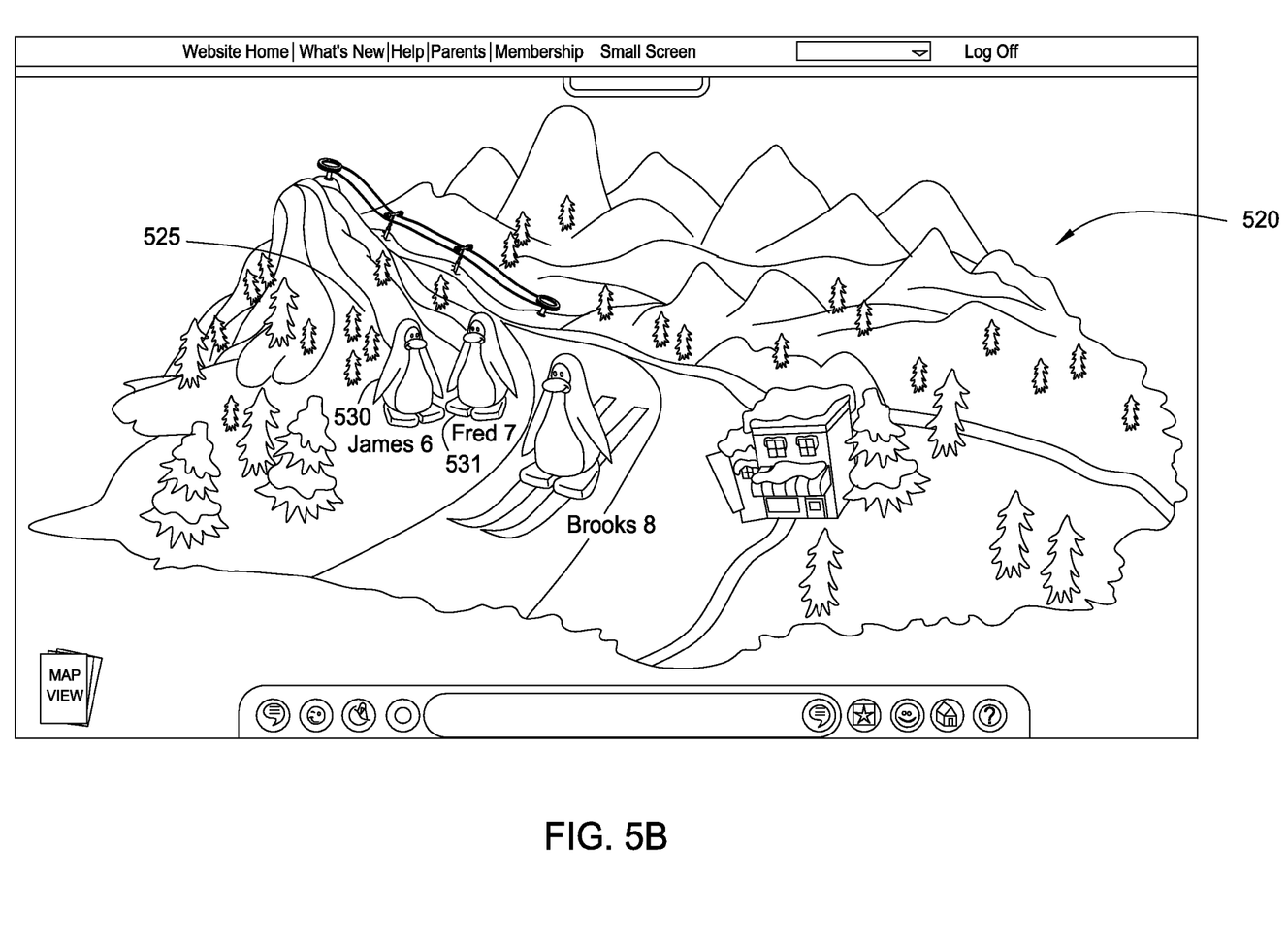
FIG. 5B depicts a map having dynamic and customized avatars according to another embodiment of the invention.

FIG. 5B depicts a map having dynamic and customized avatars, according to one embodiment of the invention. As illustrated, more than one user can be displayed as performing a certain action at a certain place, and doing so with each other at a given time. This provides a simple and intuitive way to convey who is where (at least within a multiuser virtual environment), what activity or activities they are engaging in, and with whom they are doing the activity or activities. In FIG. 5B, the map 520 includes avatars 530-531 of online friends. Further, the avatars 530-531 are positioned on the map in accordance with where the friends are in the virtual world, thus depicting their locations. In addition, the particular background 525 behind the avatars provides a visual depiction of what the location looks like. Finally, the avatars 530-531 show that the friends "James6" and "Fred7" are chatting to each other.

Figure 6:
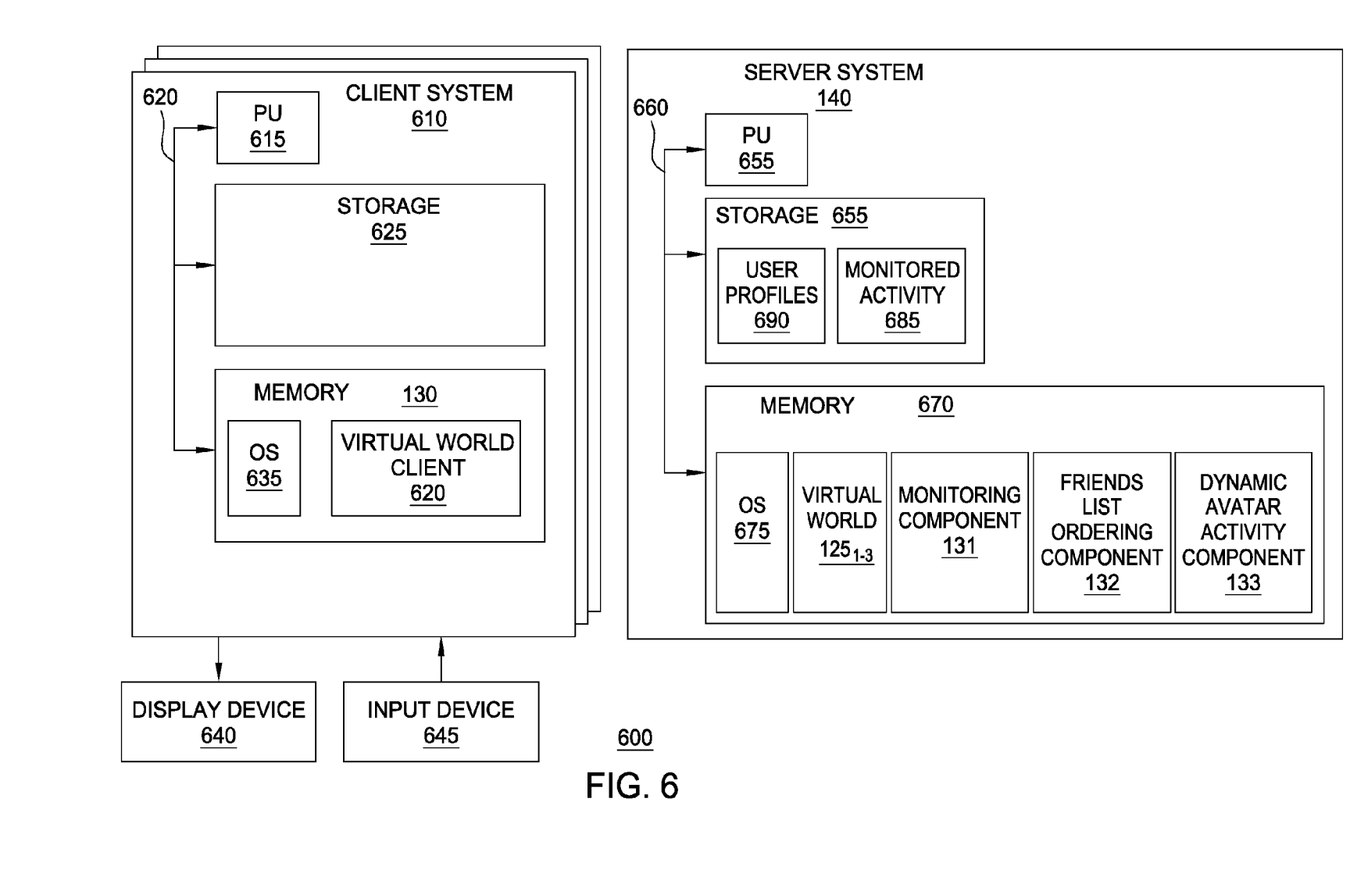
FIG. 6 is a block diagram illustrating a system configured to provide a virtual environment, according to one embodiment of the invention.

FIG. 6 is a block diagram illustrating a system 600 configured to provide a computing server platform, according to one embodiment of the invention. As shown, the system 600 includes a plurality of client systems 610 and a server system 650, communicatively coupled via a network 680. Client systems 610 is included to be representative of a variety of different computer systems, e.g., desktop computers, server computers, laptop computers, tablet computers, gaming consoles, hand-held gaming devices, mobile devices and the like. The client systems 610 illustrated in FIG. 6, however, are merely examples of computer systems in which embodiments of the present invention may be used. Moreover, it is explicitly contemplated that embodiments of the invention may be implemented using any device or computer system capable of performing the functions described herein.

As shown, each client system 610 includes, without limitation, a processor 615, which obtains instructions and data via a bus 620 from a memory 630 and storage 625. Processor 615 is a programmable logic device that performs instruction, logic, and mathematical processing, and may be representative of one or more CPUs. Storage 625 is representative of hard-disk drives, SSD drives, flash memory devices, optical media and the like. Generally, the storage 625 stores application programs and data for use by the client system 610. The client systems 610 are connected to the network 680, e.g., via network interfaces.

The memory 630 is any memory sufficiently large to hold the necessary programs and data structures. Memory 630 could be one or a combination of memory devices, including Random Access Memory, nonvolatile or backup memory (e.g., programmable or Flash memories, read-only memories, etc.). In addition, memory 630 and storage 625 may be considered to include memory physically located elsewhere; for example, on another computer coupled to the client system 610 via bus 620. The memory 630 includes the virtual world client 120 and an operating system ("OS") 635. Operating system 635 is software used for managing the operation of the client system 610. Examples of OS 635 include UNIX, versions of the Microsoft Windows® operating system and distributions of the Linux® operating system. Additional examples of OS 635 include custom operating systems for gaming consoles, including the custom operating systems for systems such as the Microsoft Xbox 360®, Nintendo Wii® and Sony PlayStation® 3.

Additionally, the client systems 610 each are coupled to display devices 640 and input devices 645. The display devices 640 may include output devices such as monitors, touch screen displays, and so on. For instance, the display devices 640 may include a display device used to visually depict a virtual environment. As an example, the display 640 may provide a touch sensitive surface allowing the user to select different locations within the virtual environment and control the movement of an avatar within the virtual environment. The input devices 645 represent a wide variety of input devices, including keyboards, mice, controllers, and so on.

Furthermore, the input devices 645 may include a set of buttons, switches or other physical device mechanisms for controlling the client system 610. For example, the input devices 645 could include a set of directional buttons used to navigate an avatar through a virtual environment presented on the display 640.

As shown, the server system 650 includes, without limitation, a processor 655, which obtains instructions and data via a bus 660 from a memory 670 and storage 665. Processor 655 is a programmable logic device that performs instruction, logic, and mathematical processing, and may be representative of one or more CPUs. Storage 665 is representative of hard-disk drives, flash memory devices, optical media and the like. Generally, the storage 665 stores application programs and data for use by the server system 650. The server system 650 is connected to the network 680, e.g., via a network interface.

The memory 670 is any memory sufficiently large to hold the necessary programs and data structures. Memory 670 could be one or a combination of memory devices, including Random Access Memory, nonvolatile or backup memory (e.g., programmable or Flash memories, read-only memories, etc.). In addition, memory 670 and storage 665 may be considered to include memory physically located elsewhere; for example, on another computer coupled to the server system 650 via bus 660. The memory 770 includes an OS 775 and virtual world servers running virtual worlds $125_{1-3}$, a monitoring component 131, a friends list ordering component 132, and a dynamic avatar generating competent 133. In some embodiments, however, the virtual world $125_{1-3}$, monitoring component 131, friends list ordering component 132, and dynamic avatar generating competent 133 are stored separately in the memory of at least two or more server systems 750, rather than stored in the memory of a single server 750. Further embodiments may lack one or more, or combine one or more, of the virtual world $125_{1-3}$, friends list ordering component 132, and/or dynamic avatar generating component 133. Operating system 675 is software used for managing the operation of the server system 650. Examples of OS 675 include UNIX, versions of the Microsoft Windows® operating system and distributions of the Linux® operating system. Additional examples of operating system 675 include custom operating systems for gaming consoles, including the custom operating systems for systems such as the Microsoft Xbox 360®, Nintendo Wii® and Sony PlayStation® 3.

The storage 765 of the server system 750 stores at least the user profiles 790 and monitored activity 785 of the virtual world $125_{1-3}$. User profiles 790 may include avatar photos and animations, user names, and passwords. Examples of monitored activity 785 include time stamps recording the times when users log in and out, user location within, and other information pertaining to user interactions and activity in, one or more virtual worlds $125_{1-3}$.

In the preceding, reference is made to embodiments of the invention. However, the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special-purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method for providing a list of users, the method comprising:
receiving, from a first user interacting with a virtual environment, a request to view a list of users associated with the first user;
weighting one or more interactions that have occurred within the virtual environment between the first user and one or more users in the list of users using predefined weight values, each weight value being associated with an interaction type;
further weighting one or more of the interactions based on timestamps identifying when each interaction occurred;
determining an ordering of the list of users based on at least a sum of the one or more weighted interactions;
generating, by operation of one or more computer processors, a graphical representation of the list of users according to the determined ordering, wherein the graphical representation depicts current activities of one or more avatars within the virtual environment corresponding to one or more users in the list of users, and wherein the graphical representation further depicts current locations within the virtual environment of one or more users in the list of users; and
if a request is received from the first user to fix a position of one of the users in the list of users, reordering a position of the one of the users in the list based on the request to fix.

2. The computer-implemented method of claim 1, further comprising:
weighting one or more of the interactions based on frequency of occurrence.

3. The computer-implemented method of claim 1, further comprising:
identifying, for one or more users in the list, interests shared by the first user and the one or more users in the list, wherein the ordering of the list is determined further based on the identified shared interests.

4. The computer-implemented method of claim 1, wherein the determining the ordering of the list of users is performed in response to determining that a count of users in the list of users exceeds a specified minimum.

5. A non-transitory computer-readable storage medium storing a program, which, when executed by a processor performs an operation for providing a list of users, the operation comprising:
receiving, from a first user interacting with a virtual environment, a request to view a list of users associated with the first user;
weighting one or more interactions that have occurred within the virtual environment between the first user and one or more users in the list of users using predefined weight values, each weight value being associated with an interaction type;
further weighting one or more of the interactions based on timestamps identifying when each interaction occurred;
determining an ordering of the list of users based on at least a sum of the one or more weighted interactions;
generating, by operation of the processor, a graphical representation of the list of users according to the determined ordering, wherein the graphical representation depicts current activities of one or more avatars within the virtual environment corresponding to one or more users in the list of users, and wherein the graphical representation further depicts current locations within the virtual environment of one or more users in the list of users; and
if a request is received from the first user to fix a position of one of the users in the list of users, reordering a position of the one of the users in the list based on the request to fix.

6. The non-transitory computer-readable storage medium of claim 5, wherein the operation further comprises:
identifying, for one or more users in the list, interests shared by the first user and the one or more users in the list, wherein the ordering of the list is determined further based on the identified shared interests.

7. The non-transitory computer-readable storage medium of claim 5, wherein the determining the ordering of the list of users is performed in response to determining that a count of users in the list of users exceeds a specified minimum.

8. A system, comprising:
a processor; and
a memory, wherein the memory includes an application program configured to perform an operation for providing a list of users, the operation comprising:
receiving, from a first user interacting with a virtual environment, a request to view a list of users associated with the first user,
weighting one or more interactions that have occurred within the virtual environment between the first user and one or more users in the list of users using predefined weight values, each weight value being associated with an interaction type,
further weighting one or more of the interactions based on timestamps identifying when each interaction occurred,
determining an ordering of the list of users based on at least a sum of the one or more weighted interactions,
generating a graphical representation of the list of users according to the determined ordering, wherein the graphical representation depicts current activities of one or more avatars within the virtual environment corresponding to one or more users in the list of users, and wherein the graphical representation further depicts current locations within the virtual environment of one or more users in the list, and
if a request is received from the first user to fix a position of one of the users in the list of users, reordering a position of the one of the users in the list based on the request to fix.

9. The system of claim 8, wherein the operation further comprises:
identifying, for one or more users in the list, interests shared by the first user and the one or more users in the list, wherein the ordering of the list is determined further based on the identified shared interests.

10. The system of claim 8, wherein the determining the ordering of the list of users is performed in response to determining that a count of users in the list of users associated with the first user exceeds a specified minimum.

11. The method of claim 1, wherein the ordering of the list is determined further based on a grouping of one or more users in the list who are currently jointly participating in an activity.

12. The non-transitory computer-readable storage medium of claim 5, wherein the ordering of the list is determined further based on a grouping of one or more users in the list who are currently jointly participating in an activity.

13. The system of claim 8, wherein the ordering of the list is determined further based on a grouping of one or more users in the list who are currently jointly participating in an activity.

14. The method of claim 1, wherein the graphical representation further depicts at least one of current real-world activities and real-world locations of one or more users in the list.

15. The non-transitory computer-readable storage medium of claim 5, wherein the graphical representation further depicts at least one of current real-world activities and real-world locations of one or more users in the list.

16. The system of claim 8, wherein the graphical representation further depicts at least one of current real-world activities and real-world locations of one or more users in the list.

* * * * *